UNITED STATES PATENT OFFICE.

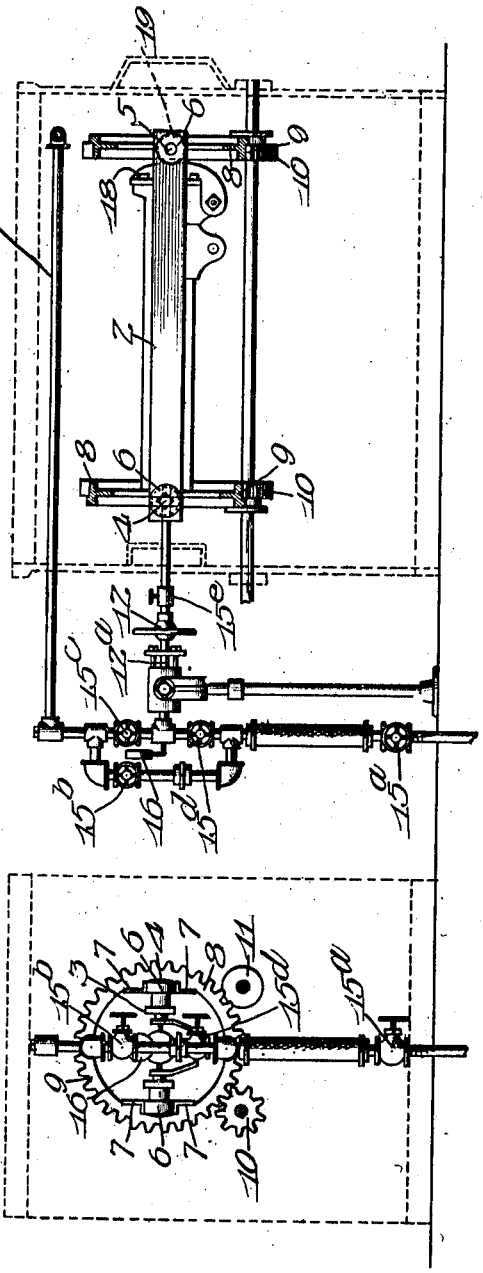

ALEXANDER P. ANDERSON, OF CHICAGO, ILLINOIS.

ART OF TREATING STARCH MATERIALS.

1,035,835.  Specification of Letters Patent.  Patented Aug. 20, 1912.

Application filed April 24, 1907. Serial No. 370,004.

*To all whom it may concern:*

Be it known that I, ALEXANDER P. ANDERSON, a citizen of the United States, residing at Chicago, in the county of Cook and State of Illinois, have invented new and useful Improvements in the Art of Treating Starch Materials, of which the following is a full, clear, concise, and exact description, reference being had to the accompanying drawing, forming a part of this specification.

My invention relates to an improvement in the art of treating starch material and has for its object a new process for the production of puffed or swelled starch-materials, such as starch, cereal grains of all kinds, whether hulled or unhulled, and other seeds or kernels containing starch.

In my United States Patent No. 707,892, dated August 26, 1902, I have described a process of swelling starch-materials. According to such process, the material in a substantially air-dry condition is heated under pressure, which when suddenly reduced causes the moisture contained in the material to burst into steam, whereby the material is puffed or inflated several times its original volume. It will be observed that by this process the puffing is accomplished with steam derived solely from the natural moisture of the material under treatment. Now, during the practice of the said process with cereal grains, I discovered that by injecting steam into the cylinder at a certain stage of the process, so as to subject the grain in the cylinder to the action of the steam, I obtained far better results. For example, when the material is in a practically anhydrous condition, or when it contains an amount of moisture that is insufficient for its proper swelling or puffing, the necessary percentage of moisture may be readily supplied according to my new method by the injection of steam into the cylinder containing the material under treatment. In this connection I furthermore discovered that the best and most satisfactory results are obtainable by the use of dry steam, preferably steam in a superheated condition, as will hereinafter be fully explained.

In carrying out my new process in the preferred manner, the material under treatment is heated in a closed receptacle which is preferably rotated, provision being made for the admission of steam into and withdrawal of vapors from the receptacle, and for the sudden reduction of pressure surrounding the material for the purpose of puffing or swelling the same.

In the accompanying drawings I show one form of apparatus suitable for treating starch materials in accordance with the herein described process.

Figure 1 is a side view of the piping together with a longitudinal sectional elevation of the drum-support in the oven, the latter being indicated in dotted lines; Fig. 2 is a rear end view of the oven; Fig. 3 shows the drum in charging and discharging positions, the latter position being indicated in dotted lines. Fig. 4 is a sectional view of the rear end of the drum; and, Fig. 5 is a section of the drum on the line 5—5 of Fig. 4.

The material to be treated is put into a drum 2, mounted upon a suitable car capable of being rolled about and brought to the various parts of the apparatus for handling. The car consists of two side members 3, 3, having a trunnion 4 extending therebetween at the rear end; a shaft or axle 5 connects the forward ends of said members. Small wheels or rollers 6 are mounted outside of the members 3, upon the projecting ends of trunnion 4 and shaft 5. The cars run on a track 7 within the oven consisting of four rails fastened to the inside of the cage 8. At each end of the oven is a ring 9 having teeth outside forming a gear, which meshes with another gear 10 adapted to rotate the cage. The gears 10 and rollers 11 support the cage and inclosed drum, in addition to turning it by any suitable power applied to one of their supporting shafts outside of the oven. After the drum has been run into the oven, a steam-connection is made at 12, thus admitting steam to the flattened pipe 13 inside of the drum. The steam escapes into the drum through numerous holes 14 in the pipe, said holes becoming more frequent in proportion to the drop in pressure as the steam advances.

By means of gears 9 and 10 the cage containing the drum is rotated slowly during the heating. Rotation is permitted by the stuffing box $12^a$ which at the same time maintains the steam-connection. The arrangement of the piping shown is as follows: $15^a$, $15^b$, $15^c$, $15^d$ and $15^e$ are valves; 16 is a pressure gage. By opening valves $15^b$ and 15ᵃ, and closing valves 15ᵈ and 15ᶜ, the steam is by-passed around the drum. By closing valves 15ᵇ and 15ᵈ, and opening 15ᶜ, the pressure in the drum may be brought to any desired point, as shown by gage 16. To reduce the pressure in the drum, valve 15ᶜ may be closed, and 15ᵈ opened. Thus, by proper valve-manipulation the conditions of pressure and temperature in the drum may be regulated and controlled absolutely. It will be understood that the oven is heated by any suitable or desired means,—as, for example, by gas.

The lid 18 of the drum is clamped tightly closed, a suitable soft-metal gasket being provided to cause an airtight connection, when the drum is in the horizontal position in the frame. In order that the heating may not unseal the lid, I prefer to make the drum of bronze, or some material having a higher coefficient of expansion than the side members of the frame.

To remove the drum from the oven after the heating, valve 15ᵉ is closed, the drum is disconnected at 12, and is run out of the oven to a raising and lowering mechanism suitably connected with the drum through the arm 17. By means of this mechanism the drum is lowered about the shaft 4 as a pivot, as indicated in dotted lines in Fig. 3. The lid 18, previously held shut by the roller 19, suddenly flies open from internal pressure, and the contents are discharged, assisted by gravity, and at the same time puff up in size. The puffed product is discharged with considerable force into a receptacle or cage many times the volume of the drum and adapted to confine it. In charging, the drum is raised by the same arm or screw 17 until it tilts upwardly, when the material to be treated may be fed into the drum.

It will be observed that in Fig. 1 the pipe 20 passes for its greater length through the upper part of the oven. The purpose of this arrangement is to cause superheating of the steam during its passage through said pipe to the drum or cylinder. For the sake of clearness and simplicity, I have omitted to show the right end of said pipe 20 connected with the source of steam supply, inasmuch as such a connection is entirely obvious to any one skilled in the art. Then again, although I have shown the pipe 20 as a single pipe, it is to be understood that the pipe 20 may be coiled back and forth in the upper part of the oven in order to provide a longer passage for the steam through the oven. Of course any other suitable form of steam superheater may be employed, the one shown being for the sake of illustration only.

For the purpose of making a full and complete disclosure of my invention, I shall describe in detail the preferred manner of carrying out the process, at the same time realizing that variations may be made therein without departing from the scope or principle of the invention.

A sufficient quantity of the material to be treated—as, for instance, rice, either hulled or unhulled—is poured into a drum or cylinder, preferably in an air-dry condition. Enough rice is used to fill the cylinder from one-half to three-fourths. The cylinder is now sealed so as to be air-tight, or substantially so, and is then run into the oven where it is heated while being rotated. It is understood that the cylinder may be either cold or hot before the rice is poured into it for treatment.

Owing to the fact that rice in its substantially air-dry condition contains a certain amount of moisture, say from 10 to 20%, the first effect of the heating is to evaporate or drive off a portion of this moisture so that the air confined in the cylinder becomes saturated with water vapor or steam. As soon as the temperature of the rice reaches 100 degrees C., or soon thereafter, pressure begins to form inside of the cylinder, the pressure increasing correspondingly with the increase of temperature. The temperature of the cylinder should be about 175 to 275 degrees C., so that any pressure up to 100 lbs. or more may be obtained within the cylinder as a result of the heat applied to it. It is evident that during the treatment the rice becomes drier, due to the conversion of its moisture into steam which causes pressure in the confined space in the cylinder not occupied by the rice. When this space is large, as e. g., when the cylinder contains only a small amount of rice— say only one-fourth or one-third filled with it—the chance of the rice drying is still greater, becoming in fact anhydrous, or nearly so, as soon as pressure begins to develop out of the steam from the moisture of the rice grains. The treatment is continued until a pressure of from 10 to 110 lbs. develops within the cylinder, depending upon the color, flavor and cook that it is desired to give the finished product. Thus, when a whitish puffed rice is desired, a pressure of 10 lbs. is sufficient; and when a cream-colored or brownish puffed rice is desired, 110 lbs. pressure is sufficient to give it this added cook and temperature. This pressure within the cylinder may now be reduced slowly, as by blowing off the confined atmosphere whereby all air is removed, together with any deleterious vapors arising from the grain. The blowing off is done slowly, as by opening the cylinder valve, and is continued until the pressure runs down to zero or only until a slight pressure reduction results. The blowing off may be continued for some time—say ten minutes or more; thus, when the rice contains about 20% of moisture and it is desired to dry out some or all of this, it may be readily accomplished by continuing the blowing off and drying until the grain contains any moisture percentage desired, readily determined by practice. The blowing out of a part or all of the pressure that has developed within the cylinder during this heating is not essential to the final step of puffing, nor is it essential that the cylinder should be made perfectly air-tight during the heating and drying of the grain as has been described. Thus, the cylinder valve may be left open and the steam or water vapor arising from the rice grains during their heating inside of the rotating cylinder may be allowed to escape as soon as formed. In this case the rice grains lose all or nearly all of their moisture. In either case, the moisture that has been given off from the grains is now replaced by injecting steam into the cylinder, especially dry and preferably superheated, in order to assure its absolute dryness, as well as to give the rice grains a higher temperature when this is desired. The steam thus injected is preferably at a pressure of 150 to 200 lbs. Enough of this steam is blown into the cylinder to produce a pressure of from 10 to 150 lbs.,—preferably 150 lbs. when the cylinder valve is closed. This steam may now be blown off slowly, in part or completely, by opening the cylinder valve, and thus the grain becomes again free from moisture to a greater or less degree. In this case, however, steam is again injected up to a pressure of about 140 lbs. This is preferably left in the cylinder for a short time—say from one-half minute to five minutes—during which time the cylinder is kept in continuous rotation so that all of the grains become exposed to the steam atmosphere now surrounding them. In this way the slight condensation of the steam on the surface, as well as on the inside of each rice grain, is uniform and even. Due to the condensation of the steam on the grain, there occurs a slight fall of pressure within the cylinder. This, however, is only slight—say from 5 to 25 lbs. per square inch. As soon as the rice grains have received enough moisture from the condensing steam to give them a total moisture of about 10 to 20%, the rice is suddenly discharged from the cylinder while under the maximum pressure, whereby a sudden and practically instantaneous reduction of pressure is obtained. This sudden reduction of pressure surrounding the grains causes the pressure within the interior of each kernel to assert itself and swell the grain to a large size, puffing it by steam inflation, rendering it cellular, and giving it all the characteristics of puffed rice.

The aim throughout the whole process is to keep the grain under treatment as near as possible in its air-dry moisture condition, not carrying it more than 10% either below or above the air-dry moisture percentage of the grain. Such moisture percentage may be maintained as explained. When the grain falls below the air-dry percentage—say to 5% or less—this loss can be replaced by the injection of steam into the cylinder; or should the grain contain too much moisture—say as high as 25%—this excess can be eliminated by blowing off the pressure, if any exists, as by leaving the cylinder valve open and thus allowing the excess moisture to escape. The final or puffing pressure, however, is obtained by injecting steam to a pressure of 75 to 150 lbs., it having been determined by practice that in order to puff any cereal grain, a pressure inside of the grain or kernels of from 75 to 150 lbs. per square inch is necessary. Steam may be injected at any time and any number of times and the pressure thus formed reduced by blowing off, but it has been found that it is preferably injected after the air-dry grain in the cylinder has become heated to a temperature varying from 115 to 180 degrees C., or to a pressure of from 10 lbs. to 110 lbs. per square inch. This is necessary in order that the steam injected may not cause too much condensation on the grains and thus prevent their perfect stirring, as well as cause them to stick together.

I have discovered that by the use of ordinary or wet steam, the condensation on the grains is more or less irregular, for the reason that the moisture carried into the cylinder by the steam is not distributed evenly over the grains but is liable to condense in certain places more than in others. Furthermore, wet steam is apt to introduce into the cylinder undesirable quantities of dripping water which causes many of the grains or particles to stick together in lumps, thus preventing the even and perfect puffing of the individual grains. What is known as saturated steam answers the purpose well when such steam does not drip water upon entering the cylinder. Small particles of moisture, nearly always present in saturated steam, condense evenly on the surface of the grains, with the result that the material preserves a desired crispness and imperviousness due to the formation of a coating that covers the entire puffed grain, seed or starch-lump. In general, however, I have found that the most satisfactory results are obtained by the use of superheated steam, which, having the characteristic properties of a gas, prevents local and uneven condensation upon entrance into the cylinder, but condenses on the grains in infinitesimal quantities and with great uniformity, at the same time causing steam-saturation of the whole grain or lump of starch-material. Also, such superheated steam adds to the material a certain amount of heat, whereby a greater sterilizing as well as cooking effect takes place.

It is not essential that the cylinder should be discharged as soon as the steam for the puffing of the grain has been injected; thus, when a greater cooking of the grain is desired the treatment may be prolonged after the steam is injected, especially when not enough steam is injected to cause puffing, until the pressure increases to puffing pressure.

It is evident that the injected steam not only fills the space unoccupied by the rice within the cylinder but also saturates each grain of rice at the pressure indicated on the cylinder pressure-gage. Each rice grain has thus an internal pressure as well as an external one. When the external pressure is suddenly or instantaneously removed, the internal pressure puffs the grain, since the steam and moisture inside of the grain cannot escape fast enough on account of the grain having been rendered resistant to the rapid escape of its moisture. Hence the whole rice kernel is puffed, increasing its volume evenly from four to fifteen times. It is apparent that when paddy rice is treated as above described, the hulls are thrown off from the expanding kernels. Inasmuch as the hulls do not themselves expand, they are now too small to inclose the kernel after it has become increased in volume as stated.

In case it is desired to subject wheat to the treatment above described, the wheat is well cleaned and scoured so as to remove all its dust and the outer epidermal layer of the grain but not any of the nutritive bran portion, since it is designed to retain in the berry all of its nutritive portion after puffing. Enough of this wheat in its substantially air-dry condition is poured into the cylinder to fill it from one-half to three-fourths. It is then treated in a manner similar to that of rice above explained, or it may be treated as follows: The cylinder with the grain is preferably sealed air tight. It is then run into the oven kept at a temperature of about 290 degrees C., and its rotation begun. After about ten minutes the cylinder-gage begins to show pressure, and after about thirty minutes the pressure has reached about 40 lbs. per square inch. Now without any blowing off of this pressure, except to blow out any condensed water that may have formed in the cylinder connections, the steam injection valve is opened and steam is injected into the cylinder at a pressure of 150 to 200 lbs. This steam just before reaching the cylinder is passed through a steam superheater, e. g., a heated coil of sufficient length set above the burners inside of the oven used for heating the rotating cylinder, such steam superheater giving the steam a temperature varying from about 185 to 500 degrees. I have found that steam superheated as high as 500 degrees, may safely be injected into the cylinder,—it being evident that the steam in passing from the superheater loses much of its heat before reaching the grain or starch material in the cylinder, whereby undue heating of the material is prevented. It is, of course, apparent that one may employ any approved form of well-known superheater used in connection with steam-boilers and the like. For this reason I have deemed it unnecessary and superfluous to show in the drawing any particular type of superheater. The superheated steam is allowed to flow into the cylinder until the gage shows about 145 lbs., when the steam injection valve is closed, leaving this pressure inside of the cylinder. The latter is now allowed to rotate within the oven about one minute longer, during which time its pressure will fall slightly to about 140 lbs., such drop in the pressure being due to the steam condensing slightly on the wheat berries. The cylinder is now stopped, disconnected and run to the discharge machine, and the lid suddenly opened to allow the confined steam and wheat to be discharged from it like shot from a gun. The wheat berries come out puffed and greatly increased in size, as well as in a substantially air-dry condition. Other cereal grains, e. g., Kafir corn, millet, corn, barley and the like may be similarly treated and puffed.

Cereal grains treated as herein set forth have essentially the characteristics of the cereal products described and claimed in my United States Patent No. 756,212, dated Aug. 2, 1904, while starch thus treated presents a product such as claimed in my United States Patent No. 769,289.

The above described process of puffing starch materials by the injection into the cylinder of dry steam, especially superheated steam, is applicable not only to starches and cereal grains of all kinds, but is equally applicable to the puffing of such starch-containing materials as spaghetti or macaroni in its various forms,—as, for example, alphabet macaroni, stick macaroni, star macaroni, and the like. The product obtained by the puffing of these last-mentioned materials according to my improved method would in substance be the same as that claimed in my co-pending application Serial No. 116,279, filed July 19, 1902; Patent No. 874279 Dec. 17, 1907.

It will be apparent from the above description, that the all-important step in this my new and improved process in the treatment of starch materials, is the subjecting of the material in a substantially air dry condition to the action of steam, especially dry and preferably superheated steam, injected into the cylinder, for the purposes above set forth. Wherefore, in the appended claims I cover broadly this step of thus subjecting the material under treatment to the action of steam, especially dry and preferably superheated steam, injected at the proper time into the cylinder containing the material.

Inasmuch as it is not necessary to have the drum air-tight during the treatment of the material, as hereinbefore fully explained, I would have it understood that by the term "closed receptacle" as used in some of the appended claims, I mean a receptacle which may or may not be air-tight according as it is desired to carry out the process with or without extreme pressure within the receptacle,—all as previously set forth.

Having thus described my invention, what is claimed as new and desired to secure by Letters Patent of the United States is:—

1. The process disclosed which consists in confining lumps or grains of starch or starch-containing material in a closed receptacle and injecting steam into the receptacle to generate an internal pressure within the lumps or grains, and then suddenly reducing the pressure within the receptacle, whereby the grains or lumps, due to their internal pressure, become puffed or expanded.

2. The process disclosed which consists in confining lumps or grains of starch or starch-containing material in a closed receptacle and injecting superheated steam into the receptacle to generate an internal pressure within the lumps or grains considerably in excess of atmospheric pressure, and then suddenly reducing the pressure within the receptacle, whereby the grains or lumps, due to their internal pressure, become puffed or expanded.

3. The process of puffing cereal grains which consists in confining the same in a closed receptacle and injecting steam into said receptacle until and whereby an internal pressure is created within the grains considerably in excess of atmospheric pressure, and then suddenly reducing the pressure within the receptacle, whereby the grains become puffed or expanded.

4. The process of puffing cereal grains which consists in confining such grains in a substantially air-dry condition in a closed receptacle and injecting superheated steam into said receptacle until and whereby an internal pressure is created within the grains considerably in excess of atmospheric pressure, and then suddenly reducing the pressure within the receptacle, whereby the grains become puffed.

5. The process of treating cereal grains which consists in heating the substantially air-dry grains in a closed receptacle, then injecting steam into the receptacle to quickly increase the pressure within and the temperature of the individual grains, and then suddenly reducing the pressure within the receptacle, whereby the grains become puffed.

6. The process of treating cereal grains which consists in heating the substantially air-dry grains in a closed receptacle, then injecting superheated steam into the receptacle to quickly increase the pressure within and the temperature of the individual grains, and then suddenly reducing the pressure within the receptacle, whereby the grains become puffed.

7. The process of treating cereal grains, which consists in heating substantially air-dry grain in a closed receptacle, meanwhile agitating or tumbling the grain, until pressure has developed therein, then reducing the pressure to reduce the moisture content of the grain, then injecting steam until a pressure of about 75 to 150 pounds per square inch has developed within the receptacle, whereby the pressure within the individual grains is increased, and then suddenly reducing this pressure, whereby the grains become puffed.

8. The process of treating cereal grains, which consists in heating substantially air-dry grain in a closed recepacle, meanwhile agitating or tumbling the grain until pressure has developed therein, then slowly reducing the pressure to reduce the moisture content of the grain, the injecting steam into the receptacle to develop an internal pressure of about 75 to 150 pounds per square inch within the individual grains, and then suddenly reducing the pressure within the receptacle, whereby the grains become puffed.

9. The process of treating cereal grains, which consists in tumbling and heating the substantially air-dry grain in a closed receptacle until pressure has developed therein, then slowly reducing the pressure to reduce the moisture content of the grain, then injecting superheated steam into the receptacle to develop an internal pressure of about 75 to 150 pounds per square inch within the individual grains, and then suddenly reducing the pressure within the receptacle, whereby the grains become puffed.

In witness whereof, I have hereunto subscribed my name in the presence of two witnesses.

ALEXANDER P. ANDERSON.

Witnesses:
A. A. THOMAS,
C. L. HOPKINS.

Correction in Letters Patent No. 1,035,835.

It is hereby certified that in Letters Patent No. 1,035,835, granted August 20, 1912, upon the application of Alexander P. Anderson, of Chicago, Illinois, for an improvement in "The Art of Treating Starch Materials," errors appear in the printed specification requiring correction as follows: Page 1, line 68, for the word "oven" read *arrangement shown in Fig. 1;* page 4, lines 65 and 66, after the word "degrees" insert the abbreviation *C.;* page 5, line 97, for the word "the" read *then;* and that the said Letters Patent should be read with these corrections therein that the same may conform to the record of the case in the Patent Office.

Signed and sealed this 29th day of October, A. D., 1912.

[SEAL.]

C. C. BILLINGS,
*Acting Commissioner of Patents.*